United States Patent [19]

Murakoshi

[11] Patent Number: 4,794,468

[45] Date of Patent: Dec. 27, 1988

[54] MAGNETIC DISK WITH ANALOG AND DIGITAL VIDEO SIGNALS RECORDED THEREON AND APPARATUS FOR MAKING RECORDING ON SAID DISK

[75] Inventor: Makoto Murakoshi, Tokyo, Japan

[73] Assignee: Fuji Photo Film, Co. Ltd., Kanagawa, Japan

[21] Appl. No.: 118,953

[22] Filed: Nov. 10, 1987

[30] Foreign Application Priority Data

Nov. 11, 1986 [JP] Japan ................................ 61-266523

[51] Int. Cl.⁴ .......................... H04N 5/78; G11B 5/00; G11B 5/09

[52] U.S. Cl. ...................................... 360/35.1; 360/32; 360/47; 358/342

[58] Field of Search ........................ 360/18, 19.1, 33.1, 360/35.1, 32, 47; 358/335, 342, 906

[56] References Cited

U.S. PATENT DOCUMENTS 4,340,913 7/1982 Care .................................. 360/46 X

*Primary Examiner*—Eugene R. LaRoche
*Assistant Examiner*—David Mis
*Attorney, Agent, or Firm*—Birch, Stewart, Kolasch & Birch

[57] ABSTRACT

A magnetic disk contains video signals, representing an image, recorded on some tracks thereof in the form of digital signals, and also contains video signals, representing the same image, recorded on other tracks thereof. A recording apparatus receives analog video signals representative of an image, and converts the received signals into associated digital data to be temporarily stored in a storage. The data stored in the storage is read out to be recorded on tracks of the magnetic disk, and also to be converted into corresponding analog signals to be recorded on other tracks thereof.

9 Claims, 3 Drawing Sheets

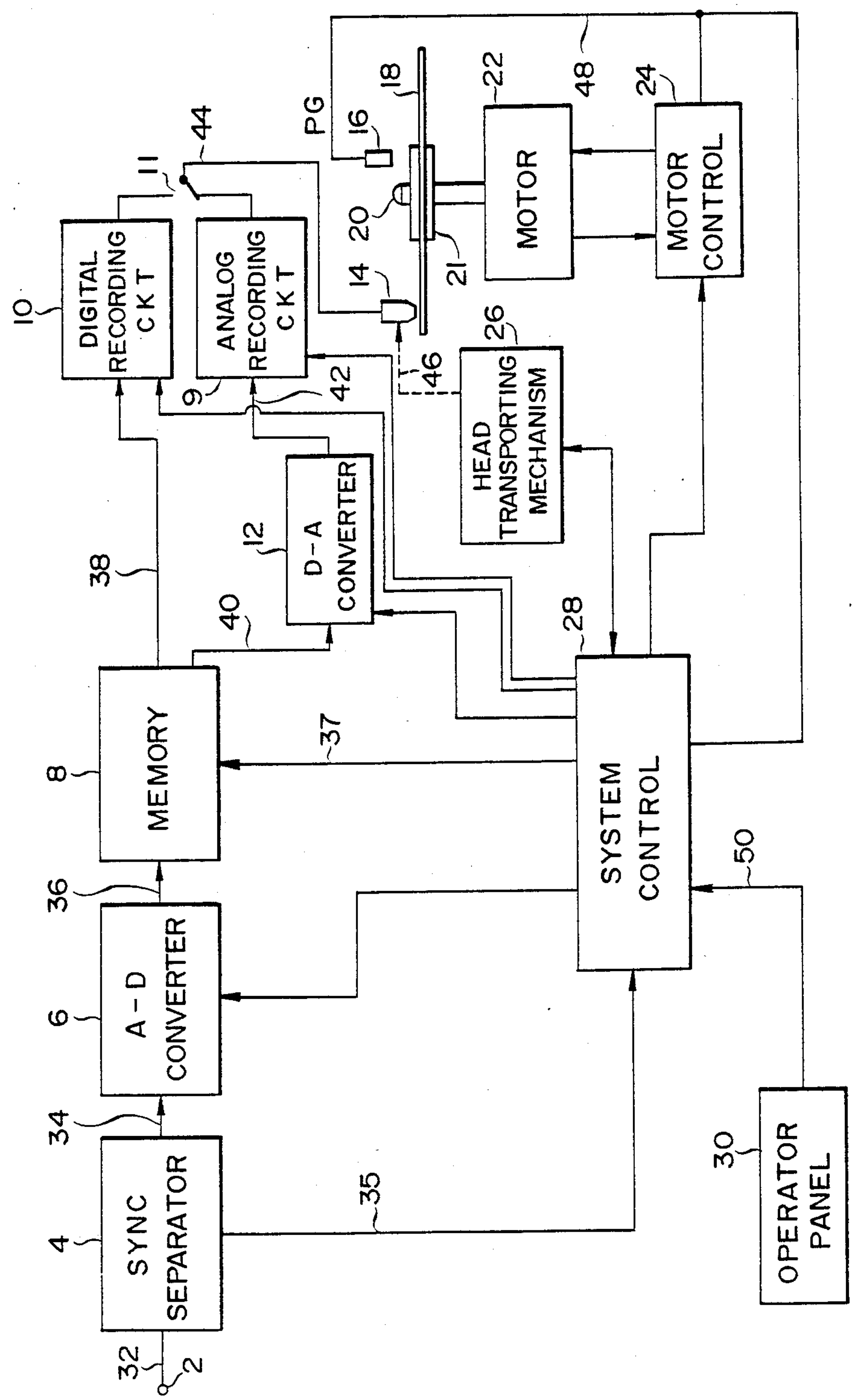
F/G. 1
SYNC SEPARATOR
A - D CONVERTER
MEMORY
D - A CONVERTER
DIGITAL RECORDING CKT
ANALOG RECORDING CKT
HEAD TRANSPORTING MECHANISM
MOTOR
MOTOR CONTROL
SYSTEM CONTROL
OPERATOR PANEL
PG

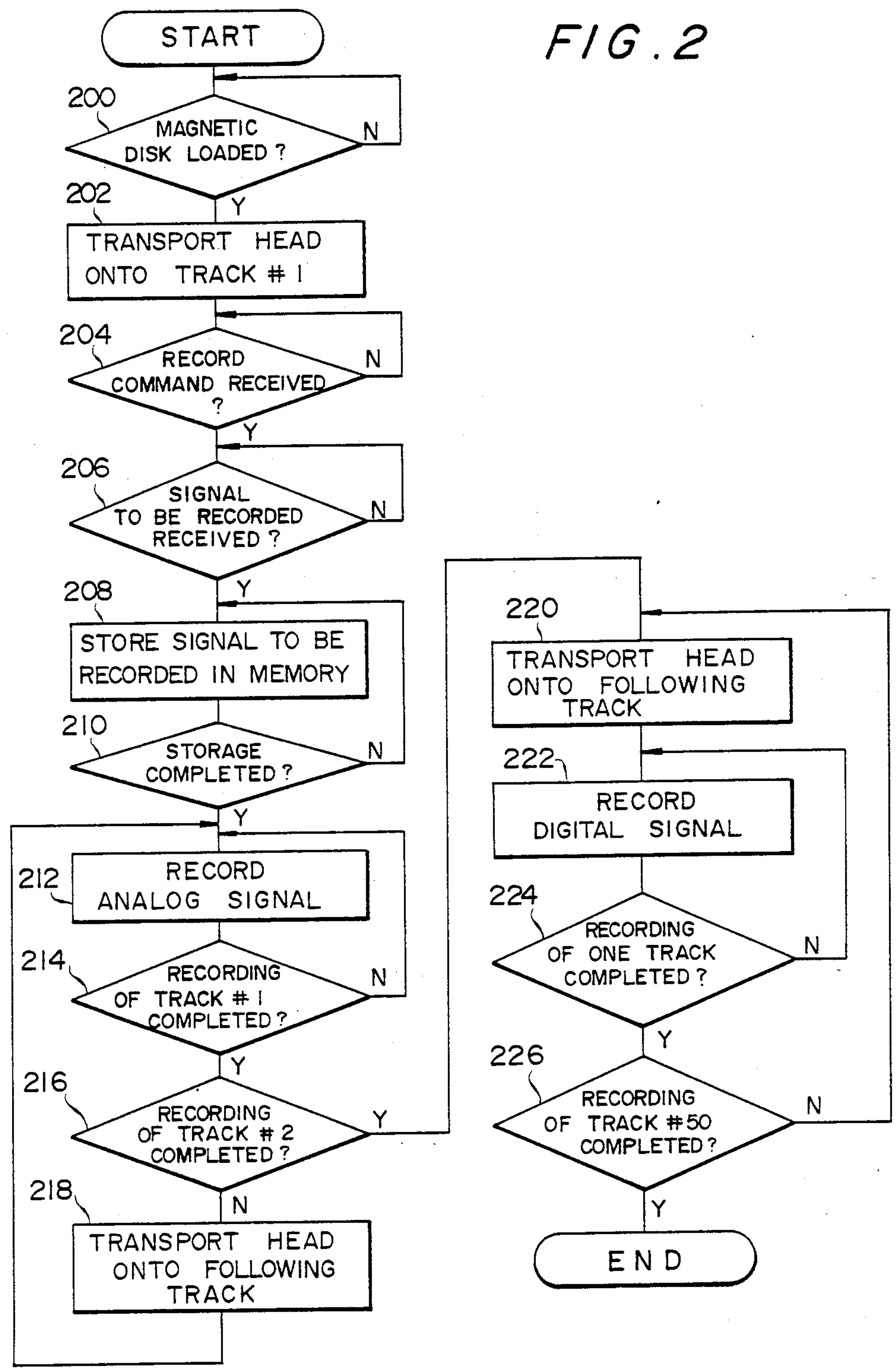
FIG. 2
START
200
MAGNETIC DISK LOADED ?
N
Y
202
TRANSPORT HEAD ONTO TRACK # 1
204
RECORD COMMAND RECEIVED ?
N
Y
206
SIGNAL TO BE RECORDED RECEIVED ?
N
Y
208
STORE SIGNAL TO BE RECORDED IN MEMORY
210
STORAGE COMPLETED ?
N
Y
212
RECORD ANALOG SIGNAL
214
RECORDING OF TRACK # 1 COMPLETED ?
N
Y
216
RECORDING OF TRACK # 2 COMPLETED ?
Y
N
218
TRANSPORT HEAD ONTO FOLLOWING TRACK
220
TRANSPORT HEAD ONTO FOLLOWING TRACK
222
RECORD DIGITAL SIGNAL
224
RECORDING OF ONE TRACK COMPLETED ?
N
Y
226
RECORDING OF TRACK #50 COMPLETED ?
N
Y
END

MAGNETIC DISK WITH ANALOG AND DIGITAL VIDEO SIGNALS RECORDED THEREON AND APPARATUS FOR MAKING RECORDING ON SAID DISK

BACKGROUND OF THE INVENTION

1. Field of the Invention

This invention relates to a magnetic disk, and more particularly to a magnetic disk employed in an electronic still camera and in a recording or reproducing system adapted to receive video signals for later recording on a recording medium or later visualization on a video monitor, for example.

2. Description of the Prior Art

On magnetic disks, heretofore, signals have been recorded in the form of either analog or digital signals.

For example, when testing or adjusting an analog reproducing apparatus for video floppies (VF), a signal representative of a reference or standard picture or image is required for comparison of the image quality reproduced. The reference image is reproduced both on a reproducing apparatus to be adjusted or tested and on some other reproducing apparatus so that the two reproduced images can be compared to each other for adjusting or testing the former reproducing apparatus. Therefore, the reference image or picture is required to be of as high a picture quality as possible. For obtaining such a high quality reference image, recording the image in the form of digital signals is preferred.

When the reference image is recorded in the form of analog signals, it can be reproduced more easily so that its contents can be determined promptly. However in the analog recording, as compared to the digital recording, the image quality tends to be undesirably lowered because of susceptibility to image signal distortion, so that it is difficult with analog recording to obtain a reference image of satisfactory image quality. In contrast thereto, in the case of recording by digital signals, while the reproducing apparatus itself becomes bulky and more sophisticated, a reference image of higher image quality may be produced.

It may be seen from above that digital signals are more preferably employed in recording a reference image to be used for testing or adjusting the analog reproducing apparatus for video floppies.

SUMMARY OF THE INVENTION

It is therefore an object of the present invention to provide a magnetic disk that allows a high quality reference image or picture to be produced, and a recording apparatus for making recordings on such a magnetic disk.

A magnetic disk according to the present invention has a track on which video signals representing a picture or image are recorded in the form of analog signals, and another track on which video signals representing the same picture or image are recorded in the form of analog signals.

A magnetic disc recording apparatus for recording video signals on tracks of a magnetic disk according to the present invention comprises analog-to-digital converting means for receiving analog video signals representing an image or picture, and for converting said video signals into corresponding digital video signals, record means for recording and video signals on said magnetic disk, and control means for controlling said analog-to-digital converting means and said record means, said control means controlling said record means and said analog-to-digital converting means to record said analog video signals on said magnetic disk, while causing said analog-to-digital converting means to also convert said analog video signals into digital video signals so as to be recorded on said magnetic disk.

BRIEF DESCRIPTION OF THE DRAWINGS

The objects and features of the present invention will become more apparent from the consideration of the following detailed description taken in conjunction with the accompanying drawings in which:

FIG. 1 is a schematic block diagram showing an embodiment of the magnetic disk recording apparatus according to the present invention;

FIG. 2 is a flow chart showing a typical operation of the embodiment shown in FIG. 1.

DESCRIPTION OF A PREFERRED EMBODIMENT

Figure 3:
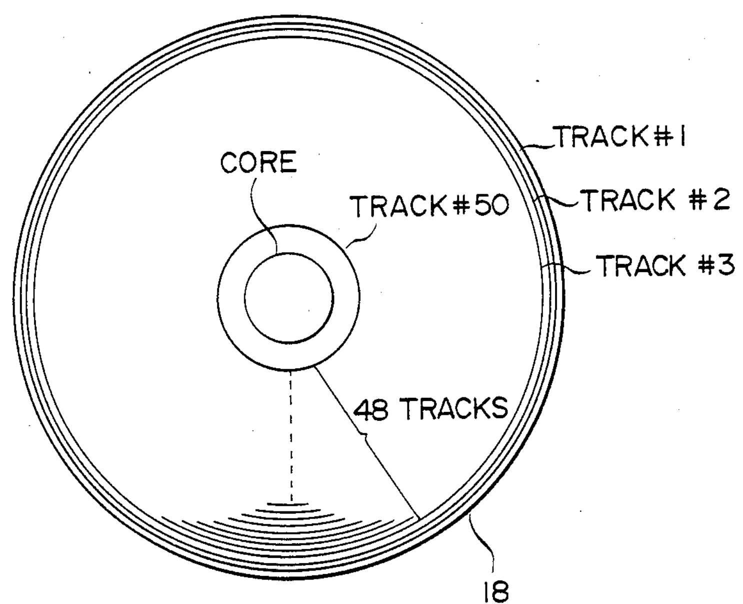
FIG. 3 is a diagrammatic view useful for understanding the recording states on the magnetic disk of the present invention.

Referring to the accompanying drawings, a magnetic disk and an apparatus for making recording on a magnetic disk, according to preferred illustrative embodiments of the present invention, will be hereafter discussed in detail.

Referring to FIG. 1, there is shown a magnetic disk recording apparatus for recording video signals representative of a standard image or picture on a magnetic disk according to an embodiment of the present invention.

In the present embodiment, signals to be recorded, such as baseband video signals representative of a standard image or picture, are supplied to an input terminal 2. These input video signals are produced in an interlaced scanning fashion by a video signal source, such as a solid state image pickup device, so that two interlaced fields make up one frame. The input terminal 2 is connected to a sync separating circuit 4. The video signals transmitted from an output 34 of sync separator 4 are converted in an analog-to-digital converting circuit 6 into corresponding digital signals so as to be stored in a memory 8, which is connected to an input line 38 to a digital recording circuit 10 and also to a line 40 connecting to a digital-to-analog converting circuit 12. The digital recording circuit 10 modulates the digital video signals to develop modulated video signals through a switch 11. The modulated video signal output is connected through the switch 11 and a connecting line 44 to a magnetic head 14. The switch 11 is a bistable circuit capable of assuming a connecting position shown in FIG. 1 and another connecting position opposite thereto, and is adapted to be controlled by a system control 28.

The sync separator 4 transmits video signals 32 supplied to the input terminal 2 to the analog-to-digital converter 6 over the connecting line 34, while separating and transmitting timing signals contained in the video signals 32, such as horizontal and vertical sync signals, to an output 35 and thence to the system control 28.

The analog-to-digital converter 6 converts the analog video signals transmitted on the connecting line 34 into corresponding digital signals, these digital signals then being transmitted over a connecting line 36 to the memory 8.

The memory 8 has a capacity such that it may store at least one frame of video signals in the form of digital data. The memory is responsive in timing to sync signals for the video signals transmitted from an output 37 of the system control 28 to store the digital video signals transmitted thereto on the connecting line 36. The memory 8 also transmits the recorded digital signals to the digital-to-analog converter 12 or to the digital recording circuit 10 on connecting line 38 under the commands from the system control 28.

In the digital-to-analog converting circuit 12, the digital signals transmitted over the connecting line 40 are converted back into corresponding analog signals, which are then transmitted to an analog recording circuit 9 via a connecting line 49. In the analog recording circuit 9, the analog video signals transmitted from the connecting line 42 are frequency modulated and amplified before being transmitted at an output which is connected to the switch 11.

The magnetic head 14 is supported by a head transporting unit 26, as schematically indicated by a broken line 46, so that its foremost part or head gap is slidably contacted with the recording surface of the magnetic disk 18, and may be transported radially along the recording surface. The magnetic head 14 is an electromagnetic transducer for recording video signals on the magnetic disk 18 and sensing the video signals from the disk 18. The head transporting unit 26 is controlled by the system control 28 to transport the magnetic head 14 to a desired on-track position on the magnetic disk 18.

The magnetic disk 18 is removably attached to a rotary shaft 20 driven into rotation by a spindle motor 22. The spindle motor is adapted to be driven in a predetermined direction at a predetermined speed under a servo control by a spindle motor control 24.

The magnetic disk 18 may be implemented as a floppy disk about 50 mm in diameter, and employed in an electronic still camera, for example. The disk has a capacity such that it may store fifty tracks of data. In the present embodiment, video signals produced in an interlaced scanning fashion, are recorded in the form of analog signals on two outermost tracks, that is, on the first and the second tracks shown in FIG. 3, while the same video signals are recorded in the form of digital signals on the remaining 48 tracks. In a particular example, when it is supposed that each frame is made up of 485 horizontal scanning lines, excluding those corresponding to the blanking period, while a luminance signal Y and a chrominance signal for each pixel are each made up of 8 bits according to a dot sequential scheme, each pixel being then made up of two bytes, each frame of a television picture may be represented by $760\times485\times2=737{,}200$ bytes. When also supposed that 16,384 bytes may be recorded in each track of the magnetic disk 18, it becomes possible to record digital signals for one entire picture or frame on 48 tracks or 786,432 bytes.

The magnetic disk 18 has a core 21 engageable with the foremost part of the output shaft 20. A phase detector or generator 16 is positioned in the vicinity of the core 21 for generating a phase generator signal PG related to a predetermined rotational phase angle of the magnetic disk 18. In the stable state, the signal PG has a period approximately equal to one V period of the video signal. The phase generator signal is transmitted over connecting line 48 to a motor control 24 and to the system control 28.

The system control 28 is adapted to control the operation of the overall recording apparatus and is advantageously configured by a processing system, such as a microcomputer. An operator panel or console 30 is connected to the system control 28 and is provided with a main operating key for allowing operator's commands to be transmitted and entered into the present recording apparatus. This operating key may be a record command key, for example. The signals instructing the recording to be made on the magnetic disk 18 are supplied on output line 50 of the operator panel 30 to the system control 28.

The system control 28 is also connected to the memory 8, analog recording circuit 9, digital recording circuit 10, digital-to-analog converter 12, head transporting unit 26 and to the motor control 24. The system control 28 is responsive to command signals from the operating section 30 to control the motor control 24 to cause the spindle motor 22 to be driven at a predetermined speed. For recording in an analog form, the system control 28 is responsive to the PG signals from the phase generator 16 to control the rotational phase of the magnetic disk 18 so that the rotational phase of the disk 18 will be at a predetermined phase angle relative to the video signals received at the input terminal 2. The digital recording circuit 10 is controlled at this time so that still-picture signals of one unit such as of one field, will be recorded on one track of the magnetic disk 18, by using the aforementioned predetermined phase angle as the reference.

Then, by referring to the flow chart of FIG. 2, the operation of the recording apparatus will be discussed.

It is first checked at step 200 whether the magnetic disk 18 has been attached to the output shaft 20 of the spindle motor 22. The system control 28 then controls the head transporting mechanism 26 to transport the magnetic head 14 to a position above the first track, step 202. At this time, the system control 28 causes the switch 11 to be connected as shown.

When the operator actuates the record command key on the operator panel 30, step 204, the system control 28 controls the spindle motor 22 through the motor control 24 to cause the magnetic disk 18 to be rotated stably at a prescribed speed. When the video signals are transmitted to input terminal 2, step 206, the analog input video signals are converted in the analog-to-digital converter 6 into corresponding digital signals. These digital signals are then stored in the memory 8 in accordance with the timing of the sync signals contained in the video signals separated at the sync separator circuit 4, step 208.

When the digital signals have been stored in the memory 8, step 210, the system control 28 causes one field of the digital video signals stored in the memory 8 to be transmitted to the digital-to-analog converter 12. These one-field signals are converted at the digital-to-analog converter 12 into corresponding analog signals. The resulting analog signals are transmitted to magnetic head 14 after frequency modulation at the analog recording circuit 9, so as to be recorded at the outermost track, or first track, of the magnetic disk 18, step 212.

When the one-track recording is terminated, step 214, the system control 28 controls the head transporting unit 26 to transport the magnetic head 14 to the position of the second track, step 218. The system control 28 then reads out the other one field of digital video signals stored in the memory 8, at the digital-to-analog converter 12. These video signals are recorded on the second track of the magnetic disk 18 in the same way as above, step 212.

When the recording on the second track of the magnetic disk 18 is terminated, step 216, the system control 28 controls the head transporting unit 26 to transport the magnetic head 14 to the position of the next or third track. At this time, the system control 28 commutates the switch 11 to a state opposite to that shown in FIG. 1. The system control then starts to read out the first one-field digital video signals stored in the memory 8. These video signals are modulated in the digital recording circuit 10. The modulated video signals are then transmitted to the magnetic head 14 so as to be then recorded sequentially in the third track et seq. on the magnetic disk 18, step 222.

After the recording on the third track on the disk 18 is terminated, step 224, part of the remaining video signals are recorded on the next track. The steps 220 to 226 are repeated sequentially in this manner until video signals of the same contents as those of the video signals already recorded in analog form on the first and second tracks are recorded in the remaining 48 tracks, in the form of digital signals.

As described above, it is possible with the present invention to record input analog video signals representative of a standard image or picture on a single magnetic disk 18 in two forms, that is, of analog signals and digital signals that are a digital replica of these analog signals. For example, when testing or adjusting an analog reproducing apparatus, a standard picture or image is required in order to make a comparison of the picture conditions. In testing or adjusting the reproducing apparatus, the standard pictures are reproduced both in the reproducing apparatus to be tested or adjusted and in another reproducing apparatus in order to make a comparison of the two reproducing apparatus. With this consideration, the standard picture or image is required to be of as good a picture quality as possible. Thus, by using the video floppy 18, the same standard picture or image as that reproduced by the analog reproducing apparatus may be reproduced as a high quality picture on a digital reproducing apparatus.

When it is desired to view the record contents of a video floppy prepared by digital recording, for example, digital reproducing apparatus would usually be required, these apparatus being bulky and sophisticated in structure. It is however possible with the video floppy 18 of the present embodiment to learn the record contents very easily by reading the analog recording tracks.

In the present embodiment, the video signals supplied to the input terminal 2 are converted in the analog-to-digital circuit 6 into corresponding digital signals so as to be then stored in the memory 8, with the analog signals converted from these digital signals, and the digital signals stored in the memory 8 being subsequently recorded in the video floppy 18. However, the system configuration may be so designed that the analog video signals supplied to the input terminal 2 are directly recorded on some tracks of the video floppy 18, and subsequently the same video signals are converted into digital form so as to be recorded on the remaining tracks of the floppy 18.

From the foregoing, it is seen that, in accordance with the present invention, signals may be recorded in two forms, that is, in the forms of analog and digital signals, so that the advantages proper to analog recording, that is, ease of reproduction, and that proper to digital recording, that is, good picture quality, may be obtained simultaneously.

While the present invention has been described with reference to the particular illustrative embodiment, it is not to be restricted by the embodiment but only by the appended claims. It is to be appreciated that those skilled in the art can change or modify the embodiments without departing from the scope and spirit of the present invention.

What is claimed is:

1. A magnetic disk comprising a first track on which video signals representing a picture are recorded in the form of digital signals, and a second track on which video signals representing said picture are recorded in the form of analog signals.

2. A magnetic disk in accordance with claim 1, wherein said disk is used in an electronic still camera system.

3. A magnetic disk in accordance with claim 1, wherein said video signals are in the form of two interlaced fields constituting one frame of a picture, said video signals being recorded on the outermost two of said tracks in the form of analog signals on a one-field-to-one-track basis, said video signals being recorded on the remaining inner ones of said tracks in the form of digital data.

4. An apparatus for recording video signals on tracks of a magnetic disk, comprising:

analog-to-digital converting means for receiving analog video signals representing a picture, and for converting said video signals into corresponding digital video signals;

record means for recording said video signals on said magnetic disk; and control means for controlling said analog-to-digital converting means and said record means;

said control means controlling said record means and said analog-to-digital converting means to record said analog video signals on desired tracks of said magnetic disk, while causing said analog-to-digital converting means to convert said analog video signals into digital video signals so as to be recorded on other desired tracks of said magnetic disk.

5. An apparatus in accordance with claim 4 further comprising memory means for storing said digital video signals, said control means reading out said digital video signals from said memory means to said record means to record the readout digital video signals on said magnetic disk.

6. An apparatus in accordance with claim 4, wherein said video signals are in the form of two interlaced fields constituting one frame of a picture, said control means causing said video signals to be recorded on the outermost two of said tracks on said magnetic disk in the form of analog signals on a one-field-to-one-track basis, while causing video signals developed from said analog-to-digital converting means to be recorded on inner ones of said tracks.

7. An apparatus in accordance with claim 5, comprising:

digital-to-analog converting means for converting digital video signals read out from said memory means into corresponding analog video signals; and selecting means responsive to said control means for selectively transmitting an output from said memory means and an output from said digital-to-analog converting means to said record means;

said control means controlling said selecting means to cause said record means to record video signals developed from said digital-to-analog converting means on a track on said magnetic disk, and video signals read out from said memory means on another track on said magnetic disk.

8. An apparatus in accordance with claim 7, wherein said video signals are in the form of two interlaced fields constituting one frame of a picture, said control means controlling said selecting means to supply video signals developed from said digital-to-analog converting means to said record means to cause said record means to record output video signals from said digital-to-analog converting means on the outermost two of said tracks on said magnetic disk on a one-field-to-one-track basis, and controlling said selecting means to supply video signals read out from said memory means to supply video signals read out from said memory means to said record means to cause said record means to record the readout video signals on tracks disposed on the inner side of said outermost two tracks.

9. An apparatus in accordance with claim 4, wherein said magnetic disk is used in an electronic still camera system.

* * * * *